UNITED STATES PATENT OFFICE.

MILTON A. HEINZER, OF PLEASANTVILLE, NEW JERSEY.

PEPPERMINT-BREAD.

952,114.　　　　　Specification of Letters Patent.　　Patented Mar. 15, 1910.

No Drawing.　　Application filed August 10, 1909.　Serial No. 512,175.

*To all whom it may concern:*

Be it known that I, MILTON A. HEINZER, a citizen of the United States, residing at Pleasantville, in the county of Atlantic and State of New Jersey, have invented certain new and useful Improvements in Peppermint - Bread; and I do hereby declare the following to be a full, clear, and exact description of the invention, such as will enable others skilled in the art to which it appertains to make and use the same.

My invention relates to new and useful improvements in processes for making bread having for an object to provide a bread that is healthful, pleasant to the taste and one which has certain medicinal qualities.

The ingredients I employ consist of the following: peppermint herb, compressed yeast, salt, sugar, condensed milk and flour.

The foregoing ingredients are mixed in the following manner. I first take one ounce of the peppermint herb, boil the same in three quarts of water twenty minutes, after which the resulting liquid is strained through a cloth and sufficient cold water is added to make five quarts in all. Two ounces of compressed yeast, three ounces of salt, four ounces of sugar, one pound of condensed milk and sixteen pounds of flour are mixed together, meanwhile portions of the peppermint herb are added during the process of mixing. The foregoing mass will make twenty-seven one pound loaves of bread, therefore it is to be understood that should more or less bread be desired, the proportion of the ingredients used will be greater or less. After the dough has been thoroughly mixed, it is placed in a receptacle and kept at a temperature of eighty degree Fahrenheit for about three hours, after which it is again worked or kneaded and allowed to stand for one-half hour longer; then scale and put into pans, giving it three-fourths proof. The dough is preferably baked in a moderate oven.

It will be appreciated that I have provided a process for making bread which will produce a food that is healthful, readily digested and no more expensive than the ordinary bread.

What I claim is:—

The described process of making bread, which consists in taking one ounce of peppermint herb and boiling the same in three quarts of water twenty minutes, straining the resultant liquid and adding a quantity of cold water thereto, mixing therewith two ounces of compressed yeast, three ounces of salt, four ounces of sugar, one pound of condensed milk, and sixteen pounds of flour, portions of the peppermint-herb being supplied during the mixing operation, the dough thus formed being thoroughly mixed and placed in a receptacle, and kept at a temperature of 80 degrees Fahrenheit, or thereabout, for about three hours, the dough then being removed from its receptacle and again being worked or kneaded and allowed to stand for a half hour longer, and finally subjected to the baking operation in a moderately heated oven.

In testimony whereof I have signed my name to this specification in the presence of two subscribing witnesses.

MILTON A. HEINZER.

Witnesses:
　ISAAC ANDREWS,
　ELISHA S. SMITH.